Patented June 21, 1949

2,474,202

UNITED STATES PATENT OFFICE 2,474,202

QUATERNARY AMMONIUM COMPOUNDS AND THE PROCESS OF MAKING SAME

John B. Rust, Montclair, N. J., assignor to Montclair Research Corporation, a corporation of New Jersey No Drawing. Application January 10, 1946, Serial No. 640,373

10 Claims. (Cl. 260—404.5)

The present invention relates to quaternary ammonium compounds and the process of making these materials. It is an object of the invention to provide readily water-dispersible quaternary ammonium compounds useful as wetting agents, softening agents, emulsifying agents and the like. It is a further object of this invention to provide water soluble materials having the property of fixing certain dyestuffs more firmly onto textile materials so that their wash-fastness, resistance to crocking and the like are improved.

The process of the present invention broadly comprises reacting a long-chain monocarboxylic acid with a polyamine and an alcohol in the presence of an acid dehydrating catalyst and thereafter converting the reaction product to a quaternary ammonium compound by further reaction with alkyl halide, sulfate or the like. In the present invention I may employ long-chain carboxylic acids containing 6 or more carbon atoms such as capric acid, caproic acid, caprylic acid, lauric acid, oleic acid, undecylenic acid, palmitic acid, stearic acid, behenic acid, and the like. As the polyamine component I may use the polyethylene amines such as ethylene diamine, diethylene triamine, triethylene tetra amine, tetra ethylene pentamine, etc., and amines such as propylene diamine, dipropylene triamine, 1-3 diamino propane, 1-4 diamino butane, hexamethylene diamine, and the like, or, in general, a polyamine of the formula $H(NHR)_xNH_2$, where R is an alkylene group and $x$ is an integer from 1 to 6. As the alcohol constituent I may use ethylene glycol, diethylene glycol, triethylene glycol, tetra ethylene glycol, hexa ethylene glycol, glycerol, methyl glycerol, di-glycerol, methyl pentane diol, etc., and also the monohydric alcohols of higher boiling point than water, such as butyl, amyl, hexyl alcohols, etc.

The long-chain fatty acid, polyamine and hydroxy compound are heated together at a condensation temperature in the presence of an acid condensing agent, which is preferably boric acid, to form an intermediate condensation product. In the polyamine $H(NHR)_xNH_2$ there is a total of $x+3$ replaceable hydrogens. The fatty acid combines initially to form salt groups but ultimately to form amide groups and the amount may range from 1 to $x$ moles, leaving from 3 to $x+2$ replaceable hydrogens. The hydroxyl compounds, which may be represented as $R''(OH)_y$ where $y$ is an integer from 1 to 4, is added in amount sufficient to condense with the remaining replaceable hydrogens. The groups introduced by the alcoholic compound may be non-hydroxylated (as when a monohydric alcohol is used or when 1 equivalent of polyhydric alcohol per replaceable hydrogen is used) or they may be hydroxylated and contain up to $y-1$ hydroxyl groups when 1 mole of polyhydric alcohol is used per hydrogen to be replaced. The amount of alcoholic compound thus may range from $3/y$ moles to $x+2$ moles. The mixtures is heated at between 150° and 300° until the amount of water evolved indicates that the condensation is substantially complete. The intermediate condensation product is a tertiary amino-amide compound containing from 1 to $x$ tertiary amino groups. It is then cooled somewhat (say to 70°–100° C.) and from one equivalent to one mole of an inorganic acid ester per tertiary amino group of the intermediate product is reacted therewith to form the quaternary ammonium compound. Inorganic acid esters are those which react readily with tertiary amine groups and include the alkyl or aralkyl halides and alkyl, sulfates and phosphates such as methyl bromide, ethyl chloride, benzyl chloride, ethylene chlorhydrin, monochlorhydrin, and dimethyl and diethyl sulfates.

The products of the present invention are readily soluble in water to form foaming solutions which are stable under both alkaline and acid conditions. The products are in some cases excellent wetting and emulsifying agents and can be used as detergents and textile laundering compounds. The materials of the present invention may also be employed as textile softening agents since in some cases they have been found to be substantive to cotton, linen, wool, rayon, casein fabrics, etc. When applied to certain fabrics which are dyed with certain dye stuffs which have not satisfactory laundering or crocking resistance the materials of the present invention have the property of imparting much greater laundry and crock resistance. In some cases the dyestuff is permanently fixed to the fabrics to give a completely laundering-fast material. Furthermore, the materials of the present invention leave the dyestuff substantially unaffected in other ways, such as brightness, color-shade, light-fastness, and the like.

The following examples illustrate the process and products of the present invention. All proportions are in parts by weight.

*Example 1.*—71.1 parts of coconut oil acids, 29.7 parts of ethylene diamine solution containing 68% ethylene diamine, 61.3 parts of glycerol and 1.5 parts of boric acid are heated together in a three-neck flask equipped with a stirrer, thermometer, and an outlet tube leading to a water cooled condenser to collect the water of reaction. An inlet tube for carbon dioxide is provided also. Heating is carried out slowly to 250° C. and maintained at this temperature for 2 hours while collecting 25.8 parts of water.

The reaction mixture is cooled to 70° C. and 25.7 parts of diethyl sulphate are added. The reaction mixture after carefully heating to 150° C. is cooled to room temperature.

A light colored, soft material is secured which is readily dispersible in hot water at 60–70° C. to provide a clear solution.

*Example 2.*—106.7 parts of coconut oil acids, 25.75 parts of diethylene triamine, 53 parts of diethylene glycol, and 1.86 parts of boric acid are heated together in a three-neck flask equipped with a stirrer, thermometer, and an outlet tube leading to a water cooled condenser to collect the water of reaction. An outlet tube for carbon dioxide is provided also. Heating is carried out slowly to 250° C. and maintained at this temperature for six hours, while collecting 20 ml. of water.

The reaction mixture is cooled to 70° C. and 19.3 parts of diethyl sulphate are added. The reaction mixture after carefully heating to 150° C. is cooled to room temperature.

A light colored, soft material is secured which is readily dispersible in hot water at 60°–70° C. to provide a clear solution.

*Example 3.*—107 parts of coconut oil acids, 26 parts of diethylene triamine, 46 parts of glycerol, and 2 parts of boric acid are heated together in a three-neck flask equipped with a stirrer, thermometer, and an outlet tube leading to a water cooled condenser to collect the water of reaction. An inlet tube for carbon dioxide is provided also. Heating is carried out slowly to 230° C. and maintained at the temperature for approximately three hours while collecting 18 parts of water.

The reaction mixture is cooled to 50° C. and 19.5 parts of diethyl sulphate is added. Heating is then slowly continued to 150° C.

A light colored, water dispersible material is secured.

*Example 4.*—96.55 parts of stearic acid, 17.5 parts of diethylene triamine, 46 parts of glycerol, and 1.7 parts of boric acid are heated together in a three-neck flask equipped with a stirrer, thermometer, and an outlet tube leading to a water cooled condenser to collect the water of reaction. An inlet tube for carbon dioxide is provided also. Heating is carried out slowly to 250° C. and maintained at this temperature until 16 parts of water of reaction are obtained.

The reaction mixture is cooled to 60° C. and 52.4 parts of diethyl sulphate added. Heating is continued then to 150° C.

A light colored material is secured which is completely water dispersible.

*Example 5.*—142 parts of oleic acid, 25.75 parts of diethylene triamine, and 46 parts of glycerol, and 2.1 parts of boric acid are heated together in a three-neck flask equipped with a stirrer, thermometer, and an outlet tube leading to a water cooled condenser to collect the water of reaction. An inlet tube for carbon dioxide is provided also. Heating is carried out slowly to 250° C. and maintained at this temperature until 19 parts of water are collected.

The reaction mixture is cooled to 70° C. and 19.3 parts of diethyl sulphate are added. The reaction mixture after carefully heating to 150° C. is cooled to room temperature.

A light colored, soft material is secured which is readily dispersible in hot water at 60–70° C.

*Example 6.*—426.6 parts of coconut oil acids, 103 parts of diethylene triamine, 212 parts of diethylene glycol, and 7.4 parts of boric acid are heated together in a three-neck flask equipped with a stirrer, thermometer, and an outlet tube leading to a water cooled condenser to collect the water of reaction. An inlet tube for carbon dioxide is provided also. Heating is carried out slowly at 250° C. and maintained at this temperature for five hours while collecting 70.9 parts of water. A light colored wax-like material is secured.

A. 33.5 parts of the above product and 3.85 parts of diethyl sulphate are mixed together and slowly heated to 150° C. The resulting material is light colored and completely water dispersible.

B. 33.5 parts of the above product and 7.7 parts of diethyl sulphate are mixed together and slowly to 250° C. and maintained at this temsulting material is light colored and completely water dispersible.

C. 33.5 parts of the above product and 3.15 parts of dimethyl sulphate are mixed together and heated slowly under reflux to 150° C. The resulting material is light colored and completely water dispersible.

D. 33.5 parts of the above product and 6.3 parts of benzyl chloride are mixed together and slowly heated under reflux at 120–130° C. for 2½ hours. The resulting material is light colored and completely water dispersible.

E. 33.5 parts of the above product and 6.45 parts of glycerol dichlorohydrin are mixed together and slowly heated under reflux at 120–130° C. for 10 minutes. The resulting material is light colored and completely water dispersible.

F. 33.5 parts of the above product and 10.9 parts of ethyl bromide are mixed together and slowly heated under reflux at 120–130° C. for 3 hours. The resulting material is light colored and completely water dispersible.

G. 33.5 parts of the above product and 8.0 parts of ethylene chlorhydrin are mixed together and slowly heated under reflux to 150° C. The resulting material is light colored and completely water dispersible.

*Example 7.*—85.3 parts of coconut oil acids, 20.6 parts of diethylene triamine, 40.8 parts of n-hexanol, and 1.67 parts of boric acid are heated together in a three-neck flask equipped with a thermometer, stirrer and an outlet tube through which the water of reaction is collected. An inlet tube for carbon dioxide is provided also. Heating is slowly carried out at 190–210° C. for four hours. There is collected 13.7 parts of water during the course of the reaction.

The reaction mixture is cooled to 50° C. and 30.8 parts of diethyl sulphate added. Heating is continued at 130° C. for 15 minutes. A light colored, water dispersible material is secured.

*Example 8.*—85.2 parts of stearic acid, 18.9 parts of tetraethylene pentamine, 31.8 parts of diethylene glycol, and 1.5 parts of boric acid are heated together in a 3-neck flask provided with a thermometer, stirrer, and outlet tube leading into a water-cooled condenser. Heating is carried out at 190°–220° C. for 4½ hours, there being liberated 10.4 parts of water during heating.

37.5 parts of the above wax and 4.6 parts of diethyl sulphate are heated together to 150° C. and held at this temperature for 10 minutes. The resulting material is readily dispersible in boiling water and may be diluted therewith to any desired concentration.

Having thus set forth my invention, I claim:

1. The process of making a quaternary ammonium compound which comprises heating, at between about 150° and 300° C. in the presence of an acid condensing agent, a mixture of a polyamine $H(NHR)_xNH_2$, where R is an alkylene radical and $x$ is a number from 1 to 6, a fatty acid having more than 6 carbon atoms and an alcoholic compound condensable with said polyamine, said alcoholic compound being of higher boiling point than water and having the formula $R'(OH)_y$ where $R'$ is a hydrocarbon radical and $y$ a number from 1 to 4 inclusive, and then adding to the tertiary amino-amide compound thus formed an inorganic acid reaction product selected from the group consisting of alkyl halides, aralkyl halides, alkyl sulfates and alkyl phosphates, and heating at a lower temperature; the proportions being 1 mole of polyamine, from 1 to $x$ moles of fatty acid, sufficient alcoholic compound to react with the remaining replaceable hydrogens of the polyamine, and from 1 equivalent weight to 1 mole of said inorganic acid reaction product per tertiary-amino group of the amino-amide compound.

2. The process of making a quaternary ammonium compound which comprises heating, at between 150° and 300° C. in the presence of boric acid, a mixture of a polyamine $H(NHC_2H_4)_xNH_2$ where $x$ is a number from 1 to 6, a fatty acid having more than 6 carbon atoms and an alcoholic compound condensable with said polyamine, said alcoholic compound being of higher boiling point than water and having the formula $R'(OH)_y$ where $R'$ is a hydrocarbon radical and $y$ a number from 1 to 4, inclusive, and then adding to the tertiary amino-amide compound thus formed an inorganic acid reaction product selected from the group consisting of alkyl halides, aralkyl halides, alkyl sulfates and alkyl phosphates, and heating at a lower temperature; the proportions being 1 mole of polyamine, from 1 to $x$ moles of fatty acid, sufficient alcoholic compound to react with the remaining replaceable hydrogens of the polyamine, and from 1 equivalent weight to 1 mole of said inorganic acid reaction product per tertiary-amino group of the amino-amide compound.

3. The process of making a quaternary ammonium compound which comprises heating, at between 150° and 300° C. in the presence of boric acid, a mixture of ethylene diamine, cocoanut oil fatty acids and glycerol, and then adding diethyl sulfate to the tertiary amino-amide compound thus formed and heating the mixture at a lower temperature; the proportions being 1 mole of ethylene diamine, 1 mole of cocoanut oil fatty acids, 2 moles of glycerol and 1 equivalent weight of diethyl sulfates.

4. The process of making a quaternary ammonium compound which comprises heating, at between 150° and 300° C. in the presence of boric acid, a mixture of diethylene triamine, cocoanut oil fatty acids and glycerol, and then adding diethyl sulfate to the tertiary amino-amide thus formed and heating the mixture at a lower temperature; the proportions being 1 mole of diethylene triamine, 2 moles of cocoanut oil fatty acids, 2 moles of glycerol and 1 equivalent weight of diethyl sulfate.

5. The process of making a quaternary ammonium compound which comprises heating, at between 150° and 300° C. in the presence of boric acid, a mixture of diethylene triamine, stearic acid and glycerol, and then adding diethyl sulfate to the tertiary amino-amide thus formed and heating the mixture at a lower temperature; the proportions being 1 mole of diethylene triamine, 2 moles of stearic acid, 2 moles of glycerol and 1 equivalent weight of diethyl sulfate.

6. A quaternary ammonium compound made according to the process of claim 1.

7. A quaternary ammonium compound made according to the process of claim 2.

8. A quaternary ammonium compound made according to the process of claim 3.

9. A quaternary ammonium compound made according to the process of claim 4.

10. A quaternary ammonium compound made according to the process of claim 5.

JOHN B. RUST.

REFERENCES CITED

The following references are of record in the file of this patent:

UNITED STATES PATENTS

| Number | Name | Date |
| --- | --- | --- |
| 2,053,616 | Landolt | Sept. 8, 1936 |
| 2,098,551 | Orthner et al. | Nov. 9, 1937 |
| 2,214,352 | Schoeller | Sept. 10, 1940 |
| 2,357,598 | Mauersberger | Sept. 5, 1944 |